UNITED STATES PATENT OFFICE.

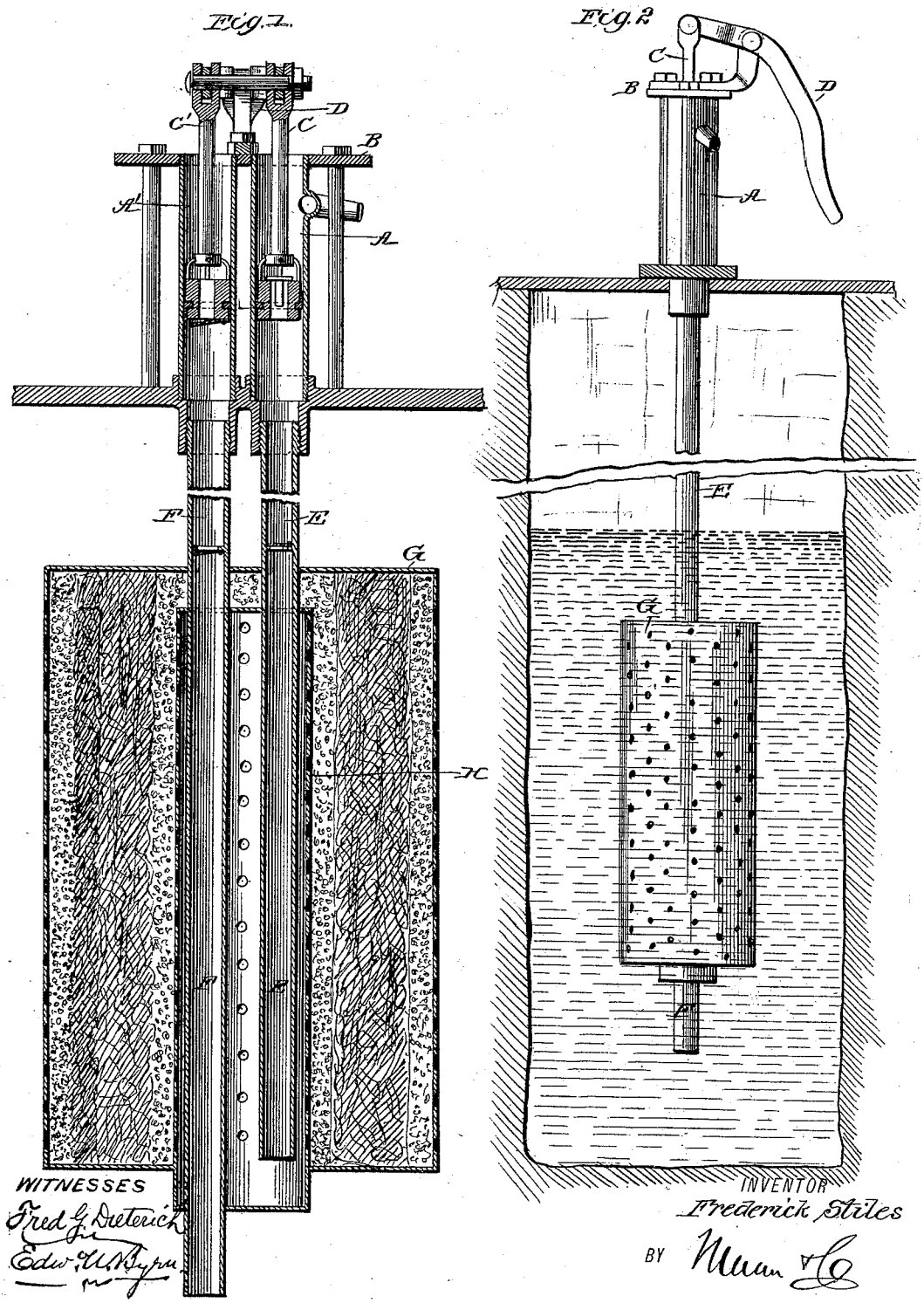

FREDERICK STILES, OF BURNET, TEXAS.

FILTER AND WATER-PURIFIER.

SPECIFICATION forming part of Letters Patent No. 415,927, dated November 26, 1889.

Application filed April 11, 1889. Serial No. 306,609. (No model.)

*To all whom it may concern:*

Be it known that I, FREDERICK STILES, of Burnet, in the county of Burnet and State of Texas, have invented a new and useful Improvement in Combined Filter and Water-Purifier, of which the following is a specification.

My invention is in the nature of a combined filter and purifier for water, designed to be placed in the bottom of the well or cistern, so as to filter the water before it is pumped up, and also to purify the water in the well by forcing air into the same.

It consists in the combination of the pump, a filter, and an air-pump, as will be hereinafter fully described.

Figure 1 is a vertical sectional elevation, and Fig. 2 is a side view.

In the drawings, A represents the cylinder of an ordinary lift-pump, and A' is that of an air-pump. These are both held in the same frame-work B in parallel position, and are provided with piston-rods C C', which are connected to and worked by the same hand-lever D simultaneously. The lift-pump has its valves opening upwardly, as usual, for raising water through its tube E, while the air-pump has its valves opening downwardly for the purpose of forcing air down its tube F. At the lower ends of these pump-tubes is arranged the filter. This consists of a perforated cylinder G, of galvanized iron, about eighteen inches in diameter and three feet six inches long. Concentrically within the same there is another perforated cylinder H, about six inches in diameter and about the same length as the outer cylinder. Into this inner cylinder there pass the two pump-tubes E and F. The tube E of the lift-pump terminates in this cylinder and opens into it, while the tube F of the air-pump passes entirely through the bottom end of the cylinder and opens into the water of the well or cistern below. At the points where the tubes E and F pass through the heads of the inner cylinder the joints are soldered or otherwise rendered tight. Between the inner and outer perforated cylinders there are packed vertical layers of charcoal and gravel or other filtering material, so that the water in the well or cistern, in passing through the outer cylinder to the interior of the inner cylinder, will be filtered by the interposed filtering material. When, therefore, the lever-handle of the pump is operated, pure filtered water is drawn from the interior of the inner cylinder, and fresh air is forced down at the same time into the water in the well to aerate and purify it.

Having thus described my invention, what I claim as new is—

The combination of a water-pump having upwardly-opening valves, an air-pump having downwardly-opening valves, and two perforated cylinders surrounding the pump-tubes and provided with a packing of filtering material, the water-pump tube opening into the inner cylinder, and the pump-tube passing entirely through both heads of the same, substantially as and for the purpose described.

FREDERICK STILES.

Witnesses:
EALY J. MOSES,
JNO. H. STAPP.